Feb. 7, 1961   E. C. ELSNER   2,970,358
SLOTTED T FASTENER
Filed June 6, 1958
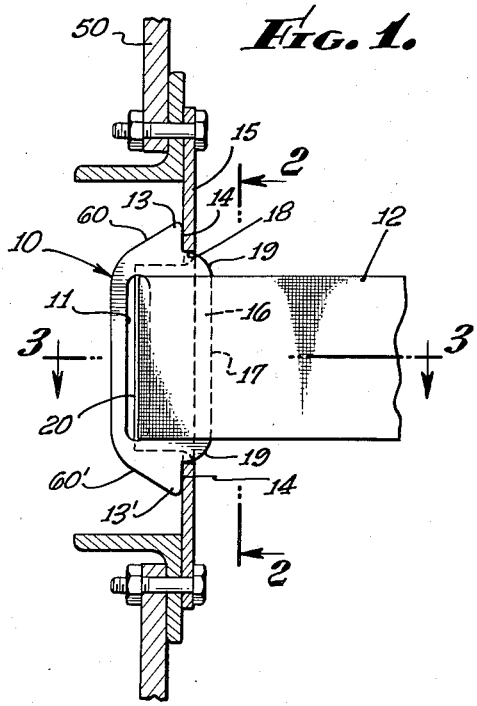
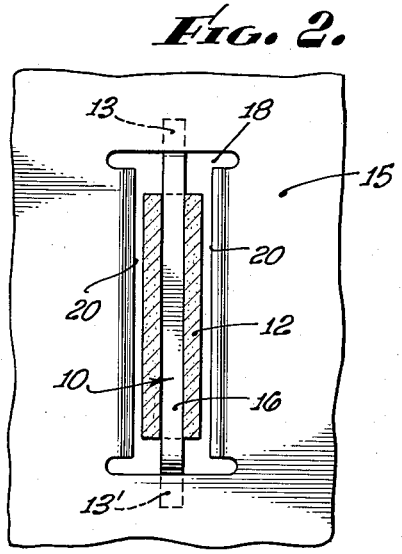
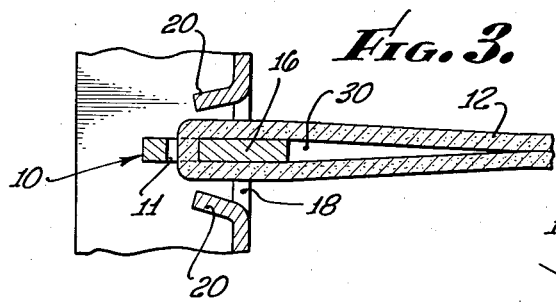
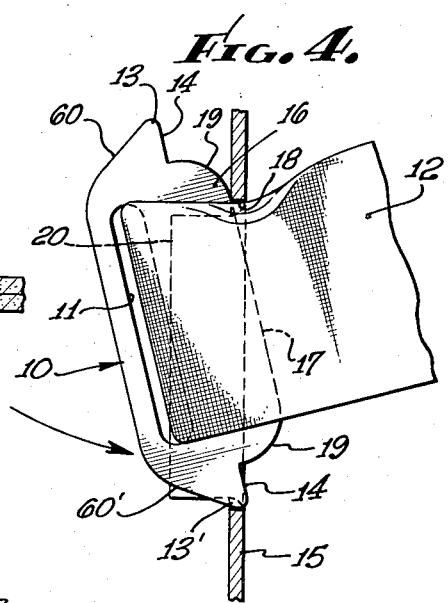
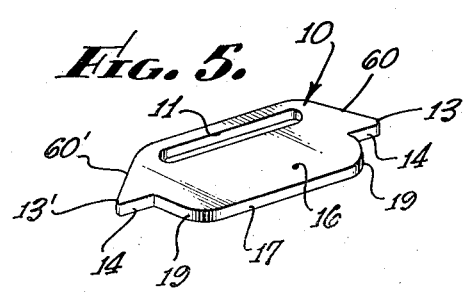
EDWIN C. ELSNER
INVENTOR.
BY Huebner & Worrel
ATTORNEYS.

United States Patent Office 2,970,358
Patented Feb. 7, 1961

2,970,358
SLOTTED T FASTENER

Edwin C. Elsner, Glendale, Calif., assignor to Aeroquip Corporation, Jackson, Mich., a corporation of Michigan Filed June 6, 1958, Ser. No. 740,430

1 Claim. (Cl. 24—201)

This invention relates to a fastening mechanism employed to connect releasably a strap or webbing to an anchor member.

The use of straps, webbing and other strap-type flexible elements in cargo binding, limiting and tie-down mechanisms has greatly increased in recent years, brought about principally by a substantial increase in cargo transportation by truck and by air cargo carrier. In such use it is often required that the strap or webbing be securely fastened to the roof, floor or sides of the cargo carrying vehicle, but also that ready release means be provided so that at arrival at destination the cargo binding mechanism may be quickly and easily released without destruction of the strap or webbing, which is then available for reuse.

If protruding catches, hooks or rails are used as the means of securing the strap or webbing to the cargo vehicle's body, compact packing is rendered more difficult, and often cargo damage is caused by the protruding element.

An object of the present invention is to provide a firm fastening mechanism which will securely connect a strap, a length of webbing, or another strap-type flexible element to the body of a cargo venicle or a rigid cargo-hold partition.

Another object of the invention is to provide a fastening mechanism which is quickly and easily releasaole without damage to the strap or webbing which it is designed to secure.

A further object of the invention is to provide a fastening mechanism which can be connected to the flush side of an anchor element.

Another object of the invention is to provide a fastening mechanism which is simple in design and construction and easy and inexpensive to manufacture and assemble.

A further object of the invention is to provide a cargo tie-down mechanism which is sturdy in construction and which will firmly and securely hold a strap or length of webbing under heavy tension, but which is also quickly and easily releasable, without damage to the strap or webbing.

The invention also comprises novel details of construction and novel combinations and arrangements of parts which will be apparent from the following description and drawings. They, however, merely describe preferred embodiments of the present invention, and are given for purposes of illustration and example only.

In the drawings:

Figure 1 is a side elevation of the fastening mechanism with the anchor element shown in section.

Figure 2 is a sectional view taken on the line 2—2 of Figure 1.

Figure 3 is a cross-section taken on the line 3—3 of Figure 1.

Figure 4 is an enlarged view similar to Figure 1 but showing the fastening element partially released from the anchor element.

Figure 5 is a perspective view of the fastening element.

A modified T-shaped piece or securing member 10 has a slotted opening 11 through which a strap or length of webbing 12 is passed. Said T-shaped piece 10 is provided with extended ears or wings 13 and 13' which have shoulders or flat surfaces 14 designed to abut against the outside seating surfaces of an anchor element 15 when the fastening mechanism is in full operative position, with pull tension being applied to the strap or webbing 12.

Said T-shaped piece 10 has a body extension or shank 16 formed at right angles to the flat surfaces of the ears or wings 13 and 13'. The body extension 16 is of somewhat greater depth, measured from a line between the flat surfaces 14 to the bottom 17 of said body extension 16, than a slot 18 in the anchor element 15, and of somewhat lesser width than said slot 18. In the preferred form of the device shown particularly in Figures 1, 4 and 5, the body extension 16 is illustrated with curved surfaces 19, but it will be understood that it is not essential that said curved surfaces 19 be provided, although said curved surfaces 19 do aid in the smooth operation of the mechanism hereinafter described.

The slot 18 in the anchor element 15 is of sufficient width to losely accommodate the body extension 16, but sufficiently narrow to form lateral lip abutments or seating surfaces for the flat surfaces 14 when the device is in the mounted position shown in Figure 1.

The slot 18 may be formed with outwardly protruding lips 20, shown best in Figure 3, which act to arrest and retard the swinging movement of the T-shaped element 10 when it is mounted in the slot 18, but said lips 20 are an optional feature of the invention.

In operation, the strap securing member or T-shaped piece 10 is mounted on a strap or webbing 12 by passing the strap or webbing 12 through the slotted opening 11 and doubling it back over the body extension or shank 16 to form a bight 30 It will be understood that said T-shaped piece 10 may be permanently mounted on said strap or webbing 12 by stitching, riveting or otherwise firmly fastening together the two sides of said strap or webbing 12 thus forming the bight 30, or may be slidably mounted thereon as shown in Figure 3, but it will be further understood that when pull tension is applied to the strap or webbing 12 in the slidable mounting shown in Figure 3, said tension will be applied to both ends of said strap or webbing 12, so that the T-shaped piece 10 is not free to slide on said strap or webbing 12 unless and until such tension is released.

The T-shaped piece 10, so mounted on the strap or webbing 12, is then obliquely inserted in the slot 18 in the plate or anchor element 15 a sufficient distance to permit one side of the slot 18 to come in contact with the strap or webbing 12 at a point sufficiently below the bottom 17 of the T-shaped element 10 to permit the warped distortion of the strap or webbing 12 hereinafter described and shown in Figure 4.

Lateral pressure is then applied to the opposite side of the body extension 16 of the T-shaped piece 10 until the strap or webbing 12 is warped against the side of the slot 18 a sufficient amount to permit the tip of the arm or wing 13' to clear the other side of the slot 18 and to pass freely therethrough.

When the tip of the ear or wing 13' has passed entirely through the slot 18, rearward pull tension is applied to the strap or webbing 12, whereupon the distorted warp of the strap or webbing 12 is removed, and the flat surfaces 14 of the T-shaped piece 10 are brought into direct contact with the outside surface of the anchor element 15, free of the outwardly protruding lips 20, and held firmly in that position by the applied tension, restricted in any pivotal movement by the protruding lips 20.

To release the mechanism, the pull tension is removed from the strap or webbing 12, and outward pressure is applied to one side of the T-shaped piece 10 until the T-shaped piece 10 is in an oblique position, with one end of the bottom 17 of the T-shaped piece 10 beyond the lip of the slot 18. Lateral pressure is then applied to the opposite side of the body extension 16 of the T-shaped piece 10, causing the strap or webbing 12 to be distortedly warped as shown in Figure 4. Said lateral pressure and warping is continued until the tip of the ear or wing 13' is moved beyond the opposite side or lip of the slot 18, whereupon the ear or wing 13' is drawn rearwardly through the slot 18, with a pivotal motion on the warped portion of the strap or webbing 12 until the top of the T-shaped piece 10 is clear of the side of the slot 18, whereupon, the T-shaped piece is moved obliquely rearwardly out of the slot 18, thereby freeing the T-shaped piece 10 from the anchor member 15.

The anchor member 15 is shown in Figure 1 as a plate mounted across an opening in a wall 50 in the manner shown. It will be recognized that the anchor member could be otherwise mounted over an open area sufficient to freely accommodate the T-shaped piece 10, or could be formed as an integral part of the ceiling, floor or wall of a vehicle or cargo compartment of a vehicle or storage space.

In the drawing, the T-shaped piece 10 is shown at Figures 1, 4 and 5 with sloping surfaces 60 and 60', but this is merely a preferred form of the invention permitting freer insertion or removal of the T-shaped piece 10 in and from the slot 18. The said T-shaped piece 10 could be formed with straight surfaces forming a right angle with the flat surfaces 14, and such construction would merely require a more extensive warping of the strap or webbing 12 for insertion or removal of the T-shaped piece 10 in or from the slot 18.

While the instant invention has been shown and described herein in what is conceived to be the most practical and preferred embodiments thereof, it will be recognized that departures may be made therefrom within the scope of the invention, which is thereby not to be limited to the details disclosed herein, but is to be accorded the full scope of the claim so as to embrace any and all equivalent devices.

Having thus described the invention, what I claim as new and desire to secure by Letters Patent is:

The combination of an anchor member comprising a rigid plate portion having an elongated closed end slot therein and seating surfaces adjacent the ends of the slot; a wide, flexible strap or webbing; and a one-piece, substantially flat, elongated securing member having projecting ears defining shoulders, said securing member having an elongated closed end slot for the reception of said strap or webbing, being of substantially the same width as said strap or webbing, and being positioned between said ears, and a shank having a length substantially the same as said first mentioned slot, said strap or webbing extending through said slot in the securing member and being looped to form a bight around the shank, the shank and looped strap being adapted for disposition in the slot of the anchor member with the shoulders of said securing member engaging the seating surfaces of the plate portion in a transverse relationship, and the securing member and strap being adapted for insertion and withdrawal through the slot in the anchor member by laterally distorting the flexible strap or webbing and by canting the securing member relative to the plane of said plate portion.

References Cited in the file of this patent

UNITED STATES PATENTS

| | | |
|---|---|---|
| 425,115 | Turnbull | Apr. 8, 1890 |
| 1,037,045 | Patton | Aug. 27, 1912 |
| 1,268,451 | Ginaca | June 4, 1918 |
| 1,822,912 | Swanstrom | Sept. 15, 1931 |
| 2,655,707 | Rubin | Oct. 20, 1953 |

FOREIGN PATENTS

| | | |
|---|---|---|
| 769,636 | France | June 11, 1934 |
| 812,976 | Germany | Sept. 6, 1951 |